United States Patent [19]
Zeitlin

[11] 3,735,097
[45] May 22, 1973

[54] EMBOSSMENT READER

[75] Inventor: Richard A. Zeitlin, Pelham Park, N.Y.

[73] Assignee: Autolectron Corporation, Mt. Vernon, N.Y.

[22] Filed: Sept. 15, 1971

[21] Appl. No.: 180,734

[52] U.S. Cl. ........................235/61.11 F, 340/146.3 Z
[51] Int. Cl. ..............................................G06r 9/00
[58] Field of Search.................235/61.11 F, 61.11 C, 235/61.11 B, 61.11 R, 61.11 A; 307/303; 317/235 M; 340/146.3 Z

[56] References Cited

UNITED STATES PATENTS

| | | | |
|---|---|---|---|
| 2,302,081 | 11/1942 | Weitmann | 235/61.11 C |
| 3,299,298 | 1/1967 | Schinner | 235/61.11 C |
| 1,165,663 | 12/1915 | Goldberg | 235/61.11 F |
| 3,456,226 | 7/1969 | Vick | 317/235 M |

*Primary Examiner*—Thomas A. Robinson
*Attorney*—Lerner, David & Littenberg

[57] ABSTRACT

A device is disclosed for detecting the presence or absence of information in the form of raised portions of an information bearing medium with said device comprising sensor means movable between a first and second position in response to a raised portion of said medium being positioned there-beneath; and pressure sensitive responsive means responsive to said sensor means moving to a second position for producing an electrical signal indicative of the presence of a raised portion beneath said sensor means. A plurality of sensors are combined with an integrated circuit to form a character recognition module and a plurality of such modules provide a device which can directly read embossed cards, such as conventional embossed credit cards. Advantageously, the pressure sensitive responsive means which respond to the movement of each sensing element comprises a pressure sensitive semiconductor region which changes electrical states to indicate the presence of a raised portion of the character sensed beneath the associated sensor. In each character recognition module, the respective pressure sensitive semiconductor regions are formed (preferably by doping) in their character recognition pattern on a single integrated circuit chip providing both the normal pressure sensitive electrical characteristics and additionally mechanical orientation and stability. The chip also includes, as an integral part thereof, the necessary logic circuitry and internal connected conductors to decode the change of state of the various semiconductor regions and thereby provide an output signal representative of the character being read. Means are provided such that the device will read different styles of display of the characters, commonly known as font styles.

14 Claims, 20 Drawing Figures

INVENTOR
RICHARD A. ZEITLIN
BY
Lerner, David, & Littenberg
ATTORNEYS

INVENTOR
RICHARD A. ZEITLIN
BY
Lerner, David, & Littenberg
ATTORNEYS

INVENTOR
RICHARD A. ZEITLIN
BY
Lerner, David, & Littenberg
ATTORNEYS

INVENTOR
RICHARD A. ZEITLIN
BY
Lerner, David, & Littenberg
ATTORNEYS

EMBOSSMENT READER

FIELD OF THE INVENTION

This invention relates to character recognition systems, more particularly to an integrated circuit structure capable of directly converting an array of pressure signals into a decoded digital signal, and to a card reader employing such an integrated circuit structure.

BACKGROUND OF THE INVENTION

In the field of character recognition, and systems for handling recognized characters, it is conventional, in credit card transactions for example, to provide a retail outlet or any other facility with an imprinter to make a record of a purchase of transaction. The printed record is then physically transferred to a central billing system where the user's account is debited accordingly. In some information handling systems, the imprinter causes its record to be transcribed in magnetic ink, and a character recognition system employing magnetic scanning is employed at the central office to initiate an appropriate entry of the transaction involved.

In an effort to simplify such systems, designers have turned to character recognition systems and card readers employing same which are capable of directly reading raised or embossed information provided on the medium being read. In one such system, raised bar information, corresponding to desired alphanumeric information, is sensed by a plurality of mechanical switches responsive to such raised bars. Such a system, however, is not only mechanically complex and therefore expensive to manufacture and maintain, but requires the employment of special purpose cards having the necessary raised bar information thereon. Other systems for directly reading embossed information have been proposed and involve mechanical, magnetic, and/or photoelectric principles; but, such systems are either too complex or expensive to justify wide spread acceptance in the industry. Moreover, the various systems available do not in a simple manner facilitate the handling of the various fonts in which embossed information is customarily displayed.

One of the problems encountered when pressure sensitive switches are employed to sense the movement of mechanical sensors, is the necessity of providing physical mounting for the switches and connection for electrical wires to the switches. It has been found that both the cost and space for such systems rendered this prohibitive when trying to sense arrays of character such as are employed on common credit cards.

SUMMARY OF THE INVENTION

The instant invention concerns itself with character recognition and is specifically directed to an integrated circuit for directly detecting or reading information in the form of pressure signals, said device finding particularly advantageous application in directly reading alphanumeric characters raised from a conventional credit card.

The heart of a reader employing the principles of this invention is a plurality of character recognition modules each comprising a plurality of sensors movable between a first and second position in response to a raised portion of the medium being positioned therebeneath; and an integrated circuit having: a plurality of pressure sensitive regions; regions arranged to implement logical functions; and regions arranged to interconnect the pressure sensitive and logic performing regions.

The pressure sensitive regions of the integrated circuit are responsive to an associated one of said sensors moving to its respective second position for producing an electrical signal indicative of the presence of a raised portion of the medium being positioned beneath the associated sensor. The various electrical signals are combined by the logic regions provided within the integrated circuit to produce an output signal representative of the character sensed. Means are provided to directly read the characters embossed on a card in the various font styles which are popular in the industry.

DETAILED DESCRIPTION OF THE PREFERRED EMBODIMENTS

Figure 1A:
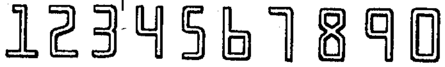
FIG. 1*a* shows the characters 1 through 0 depicted in a first font or style of display frequently employed in connection with embossed credit cards.

Turning to the Figures and first to a consideration of FIGS. 3 through 9, there is shown a card reader 10 of the instant invention which is constructed to read and transmit information with respect to embossed characters broadly designated 12 which are raised with respect to the information bearing medium, in this case a card 14. It is to be appreciated that although the invention will be described in connection with a reader capable of "reading" alpha-numeric characters, the principles hereof are obviously applicable to systems for sensing any pattern of raised indicia including those not visible to the naked eye. The reader 10 broadly includes a housing frame 16 within which is supported a plurality of character recognition modules 18 corresponding in number to the number of characters 20 on the card 14 to be read. The modules 18 are carried within a generally U-shaped support member 22 having side walls 24, 26 which sandwich the modules 18 therebetween. The bight portion 28 of the U-shaped member 22 as well as oppositely directed generally L-shaped flange portions 30, 32 secure the member 22 and the modules 18 supported therein with respect to the upper surface 34 of the reader 10.

A side surface 36 of the housing frame 16 includes an elongated slot 38 having a height just slightly greater than the thickness of the cards 14 to be read by the device 10. Positioned within the housing frame 16 is a support surface or tray 40 whose supporting surface is aligned with the lowermost edge 42 of the entrance slot 38 and functions to support the card 14 as it is pushed into the housing 16. A microswitch 44 is supported on an angled bracket 46 and includes a forwardly extending sensing finger 48 which detects when the card 14 has been inserted all the way into the interior of the housing 16. The microswitch 44 functions to maintain the card reader 10 deactivated until the card 14 is properly inserted to its extreme leftmost position in FIG. 3, such that the character recognition modules 18 will not be incorrectly influenced by the raised characters 20 as they slide toward their final resting position illustrated in FIG. 4.

To properly guide and align the characters 20 with respect to the character recognition modules 18, the entrance slot 38 is provided with an enlargement area 50 corresponding in cross section to the cross section of the raised characters 20. In addition, secured to the undersurface 52 of the modules 18 are a pair of generally L-shaped guide members 54, 56 whose downwardly depending legs 58, 60 (FIG. 9) are spaced apart by a distance corresponding to the width of the raised characters 20, in turn corresponding to the width of the aforementioned enlargement area 50. Thus, and as illustrated in FIGS. 5 through 8 when inserting the card 14 into the reader 10, the operator need only align the raised characters 20 with the enlargement area 50 and push the card to the left as viewed in FIG. 5. The depending legs 58 and 60 guarantee that the characters 20 will be properly guided with respect to the modules 18 such that the individual characters 20 will end up properly positioned with respect to the undersurface of the associated character recognition module for detection in a manner to be further described.

Figure 7:
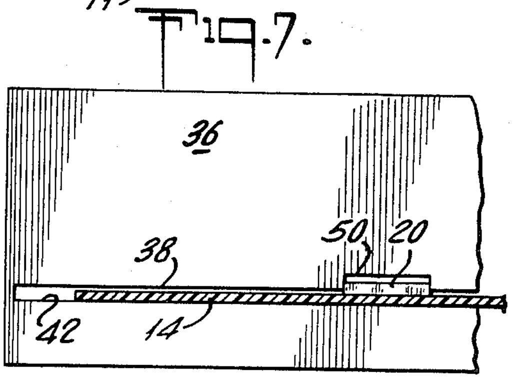
FIG. 7 is a side view taken along the arrows 7—7 of FIG. 4.
Figure 6:
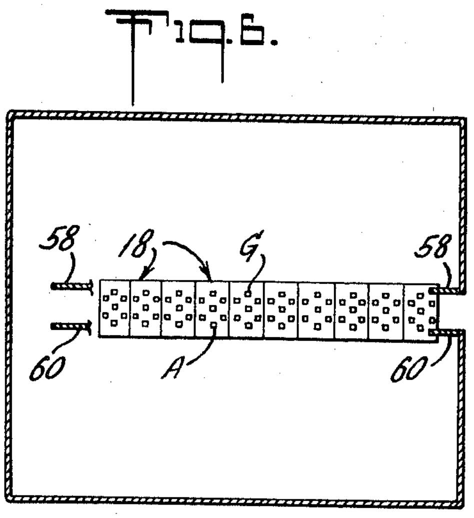
FIG. 6 is a view taken along the arrows 6—6 of FIG. 4.
Figure 8:
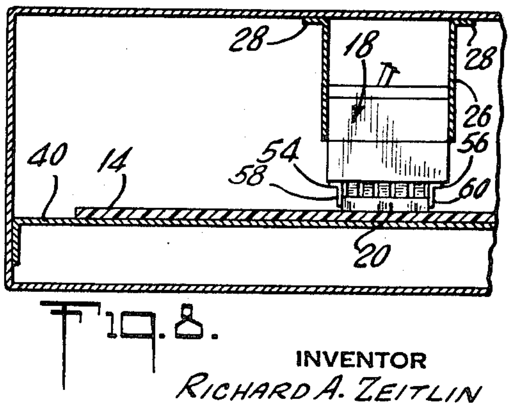
FIG. 8 is a view partly in section taken along the arrows 8—8 of FIG. 4.
Figure 10:
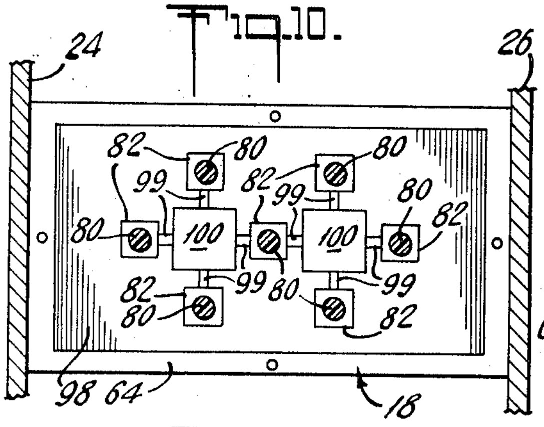
FIG. 10 is a view taken along the arrows 10—10 of FIG. 9.
Figure 11:
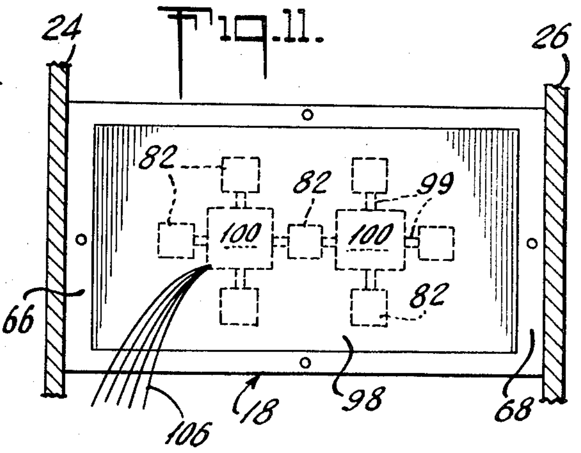
FIG. 11 is a view taken along the arrows 11—11 of FIG. 9.

With reference to FIG. 7, it will be seen that the entry slot 38 is wider than the width of the card 14. From FIG. 3 it will be appreciated that the entry slot width is excessively wide on both sides of the card 14. This arrangement permits the reader 10 to accept cards of different format. That is wherein the line of raised characters 20 may be positioned above or below the solid line position shown in FIG. 3 (for example, as represented by the phantom indication 20'). By providing that the slot 38 have such excessive width, the operator of the device 10 need not be concerned with the particular location of the line of raised characters 20; all he need do is insert such line of characters in the enlargement area 50 as has been described previously. Moreover, since only the enlargement area 50 is of sufficient height to accept the raised characters 20, it is a relatively simple matter for the operator to insert the card regardless of the location of the characters 20.

It will be appreciated that the arrangement of the elongated entry slot 38 (being wider than the card 14) together with the enlargement area 50 constitutes one technique for guaranteeing the proper alignment of the raised characters 20 with respect to the modules 18 regardless of the location of the characters 20 on the planar surface of the card 14. If desired, other techniques, such as physically moving the card within the housing frame 16, or moving the modules 18 with respect to the card 14, could be employed to properly align the raised characters 20 with respect to the modules 18.

Figure 1B:
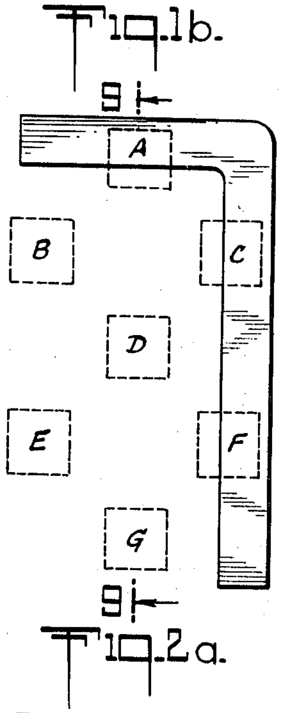
FIG. 1*b* illustrates the manner in which the various characters in FIG. 1a can be detected by a preselected pattern of sensing elements and more specifically illustrates the detection of the numeral seven.

Turning now to a consideration of the individual character recognition modules and the manner in which they detect the characters 20, FIG. 1*b* illustrates a preselected pattern of sensing elements A through G which will detect the presence of raised characters 1 through 0 in the font style of FIG. 1*a*. Using the number 7 for example, and considering the matrix of FIG. 1*c*, it will be seen that the numeral 7 will be uniquely sensed when the sensing element A, C & F are confronted with a raised portion of the numeral 7. Similarly, it will be appreciated that the numeral 1 will be uniquely detected if the sensing elements A, D & G are confronted with the associated portion of the character "1". In the character recognition modules 18 of the instant invention, sensing elements A through G are arranged in the lay out of FIG. 1*b* in the bottom surface 52 of the respective module. For instance, and with reference to FIG. 6, on the undersurface of each character recognition module 18 can be seen the pattern of seven sensing elements corresponding to the sensing elements A through G of FIG. 1*b*.

Figure 1C:
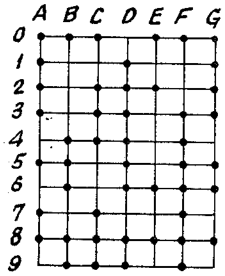
FIG. 1*c* shows the selection matrix built into the logic region to detect the characters 0 through 9 with the sensing elements of FIG. 1*b;*
Figure 1D:
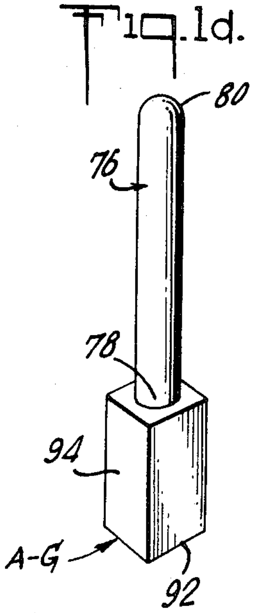
FIG. 1*d* shows one of the sensing elements of FIG. 1*b;*
Figure 9:
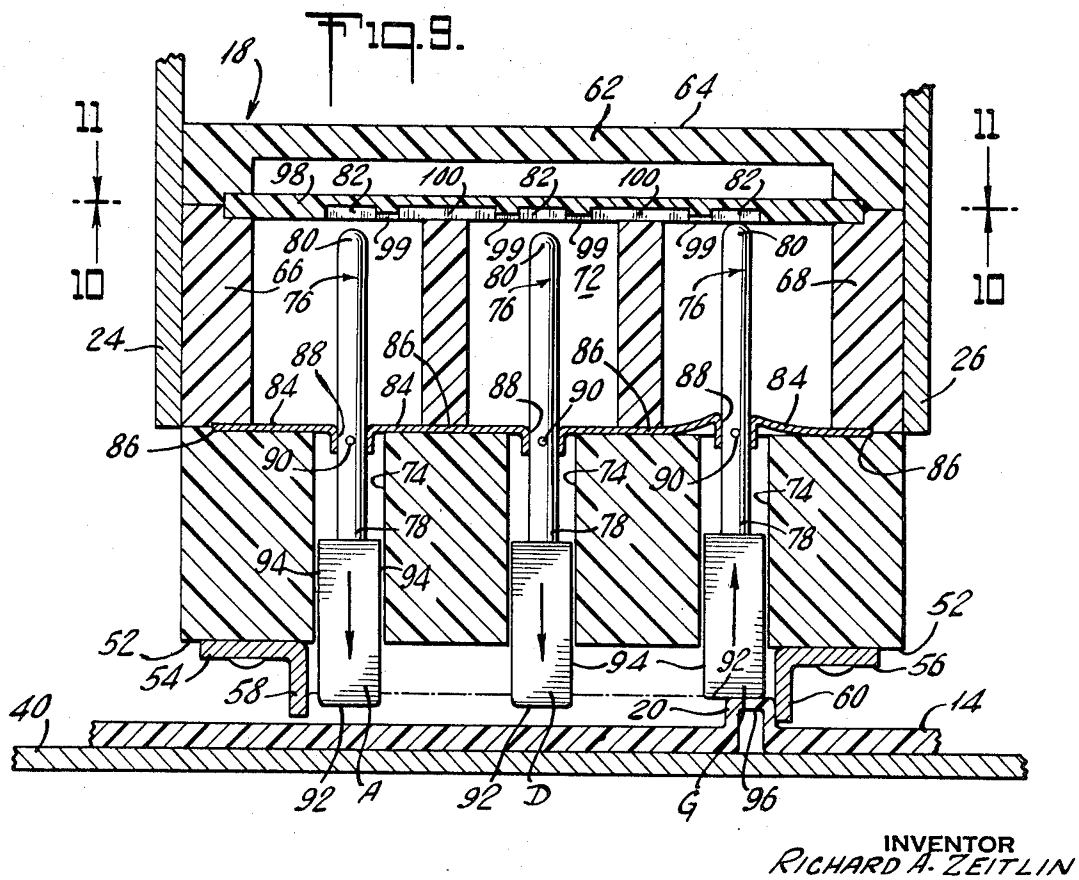
FIG. 9 is a sectional side view of one of the character recognition modules of the instant invention.

Considering FIG. 1d with FIG. 9, it will be seen that each module 18 actually comprises a housing 62 having a top wall 64, side walls 66, 68 a bottom wall and an internal chamber 72 therein. The bottom wall includes a plurality of passageways 74 therethrough with such passageways being disposed or situated in the pattern of FIG. 1*b*. Slidably positioned in each passageway 74 is an elongated member 76 provided at one end 78 thereof with a sensing element (such as A through G of FIG. 1*e*). The opposite end 80 of elongated member 76 terminates within the chamber 72 and cooperates with pressure sensitive responsive regions 82 to be described in further detail.

Elongated elements 76 are normally biased to a downward position as viewed in FIG. 9 by leaf spring elements 84 having peripherally extending portions 86 secured to the wall 70 and a central aperture 88 within which the elongated member 76 are fixedly retained for example by pins 90. The sensing elements such as A through G have front surfaces 92 which detect the presence of a raised portion of a character and include side surfaces 94 which guidingly engage the internal walls of the passageways 74 to guide the elongated members 76 in their movement between the position shown for the element A in FIG. 9 and raised position shown for the element G in FIG. 9. Of course, in the absence of a raised portion of a character confronting a sensing element, resilient element 84 will bias the respective elongated element 76 back toward its initial lowermost position.

Thus it will be appreciated, that for each character recognition module 18, a raised character will be positioned therebeneath. Moreover, and considering once again FIG. 1*b* with FIG. 1*c*, it will be appreciated that each raised character will be uniquely identified in accordance with the pattern of sensing elements A through G which are caused to be raised by a respective portion of the character therebeneath.

Positioned within the chamber 72 of each module 18 is an integrated circuit 98 having a plurality of the aforementioned pressure sensitive regions 82 arranged in an array to coact with the sensor elements A through G to switch electrical states in response to pressure being applied thereto. Such semiconductor regions preferably take the form of bistable PNPN devices appropriately biased to a first conductive state and switchable to a second state when the end 80 of an associated elongated element 76 comes into contact therewith when raised to its upper position. The construction of such a PNPN device so biased on an N type substrate is shown, for example, in U.S. Pat. No. 3,444,444, the description of which is incorporated herein by reference thereto. Positioned between the pressure sensitive regions 82 on the integrated circuit 98 are logic regions 100 (containing the logic circuitry of FIG. 12) interconnected with the pressure sensitive regions 82 by conductor regions 99. Such logic regions and conductor regions may be constructed in the manner taught for example in U.S. Pat. No. 3,461,361 showing MOSFET circuitry suitable for performing logic functions and interconnecting conductive regions. The description of U.S. Pat. No. 3,461,361 is incorporated herein by reference thereto.

Figure 12:
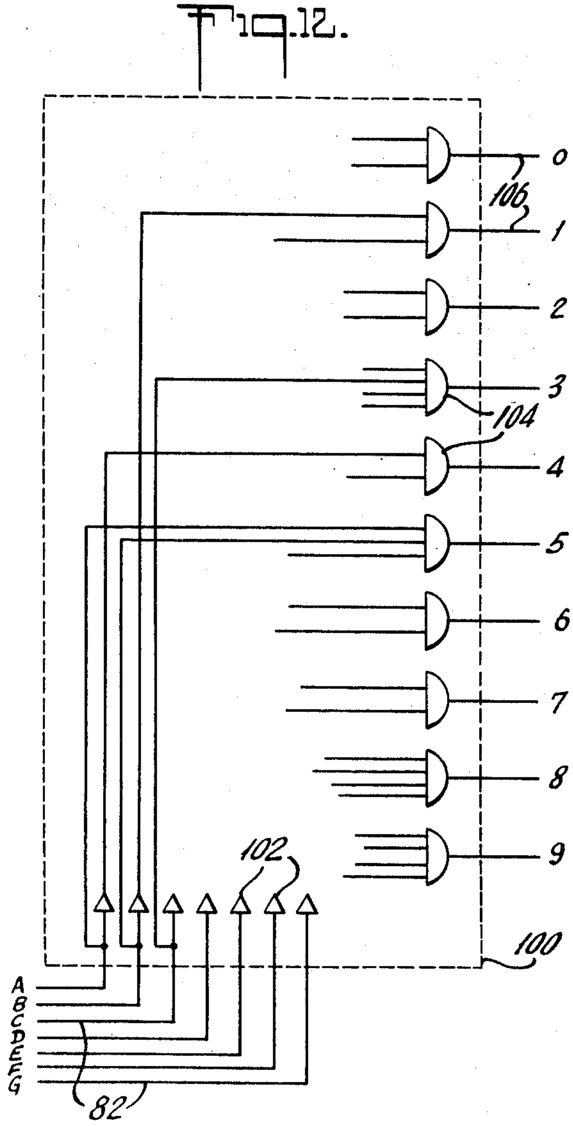
FIG. 12 shows in schematic form the logic circuitry employed in each integrated circuit when only the font style of FIG. 1a is to be detected.
Figure 13:
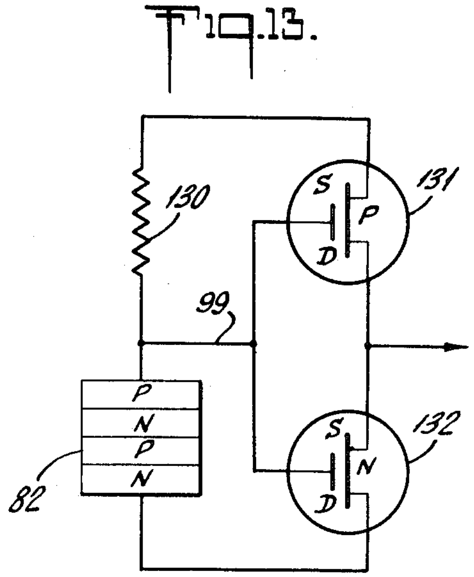
FIG. 13 is a circuit diagram of a pressure sensitive device, devices which can be formed into logic circuits and interconnecting conductors all of which can be formed on an integrated circuit.

Referring now to FIG. 13, we see a circuit which provides a pressure sensitive region 82 formed as a PNPN switch connected in series with a resistor 130 between a source of positive voltage and ground. Conducting regions 99 connect the junction of the pressure sensitive PNPN switch 82 and the resistor 130 to a pair of MOSFET's 131 and 132 which serve as portions of the logic regions 100 when properly interconnected by portions of the conducting regions 99. In operation the PNPN switch provides a high resistance so that the conducting region 99 sees a voltage very close to the positive supply voltage when no pressure is supplied to the PNPN switch. When pressure is applied thereto, the PNPN switch breaks down dropping the voltage on the conducting regions 99 to a near ground potential. The MOSFET's 131 and 132 are connected in this example as simple inverters so that the voltage on the conducting region 99 is merely inverted thereby. It should be noted that the remaining logic functions of FIG. 12 are performed by simply interconnecting appropriate logic elements such as MOSFET's 131 and 132 to form gates and the like.

It should be noted that for the matrix of FIG. 1*c*, Boolean algebra is used to express the characters 0 through 9 in terms of the sensing elements A through G as follows:

$0=\overline{D}\cdot G$
$1=\overline{B}\cdot\overline{C}\cdot$
$2=\overline{B}\cdot E$
$3=\overline{B}\cdot C\cdot D\cdot\overline{E}$
$4=\overline{A}\cdot C$
$5=A\cdot B\cdot\overline{C}$
$6=\overline{A}\cdot\overline{C}$
$7=\overline{D}\cdot\overline{G}$
$8=B\cdot C\cdot D\cdot G$
$9=A\cdot B\cdot\overline{E}\cdot\overline{G}\cdot$ It should be noted, that for the font of FIG. 1*a*, the sensing element F is actually not necessary for discrimination and therefore does not appear in the above equations. Also, and with respect to FIG. 12, wherein the triangular elements 102 are inverters and the elements 104 are "and" gates; it will be seen that the circuitry provided in the logic regions 100 simply implement the equations presented above and thereby permits the circuitry to develop appropriate outputs "0" through "9" in accordance with a corresponding character appearing beneath the character recognition module 18. The various outputs from the integrated circuit 98 appear at 106 and thereby provide output signals representative of the character read by the respective modules. Of course, the output of all of the modules 18 are combined to provide an indication of the entire number present on the card 14 being read. Such information can be transferred by appropriate cabling indicated at 108 in FIG. 3 to any facility having use or need for such information.

For example, if a purchase is to be made on credit, a storekeeper would insert the customer's credit card 14 into a reader 10 of the instant invention; and in a manner previously described, the reader 10 would sense the credit card number and forward it to a central computing facility at which facility credit information and status information could be determined. Thereafter, status information would be returned to the reader 10, and a light such as 110 lit to indicate a lost or stolen credit card or a light such as 112 lit to indicate that the customer's account lacks sufficient credit to authorize a purchase. A card selection lever 114, the purpose of which is to be further described, or a separate "transmit" button could be employed to initiate the transmission of a credit card number assuming of course that the microswitch 44 has been engaged to denote proper positioning of the card 14.

It will be appreciated from the above, that as far as described, the reader 10 of the instant invention is capable of detecting raised characters of the font style depicted in FIG. 1*a*. However, and as noted previously, a second font style, that depicted in FIG. 2*a*, is frequently employed on the popular credit card in use today. Accordingly, and to make the reader 10 of the instant invention capable of use with virtually all of the popular credit cards, means to be presently described are provided to read more than one font style.

Figure 2A:
FIG. 2*a* shows the characters 1 through 0 depicted in a second font or character display customarily employed with embossed credit cards.
Figure 2B:
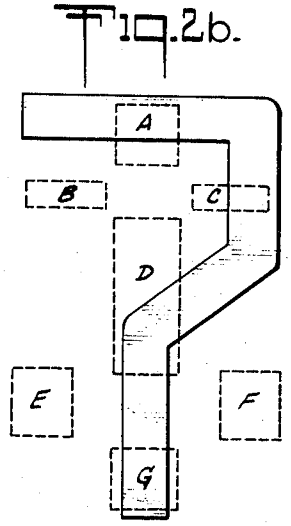
FIG. 2*b* illustrates a pattern of sensing elements useful for detecting the characters of FIG. 2*a;*
Figure 2C:
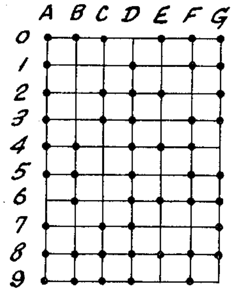
FIG. 2*c* illustrates the matrix built into the logic region employed with the sensing elements of FIG. 2*b;*
Figure 2D:
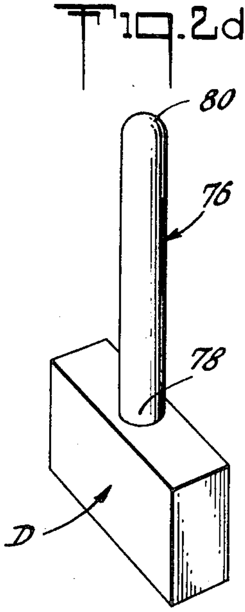
FIG. 2*d* shows one of the sensing elements of FIG. 2*b;*
Figure 3:
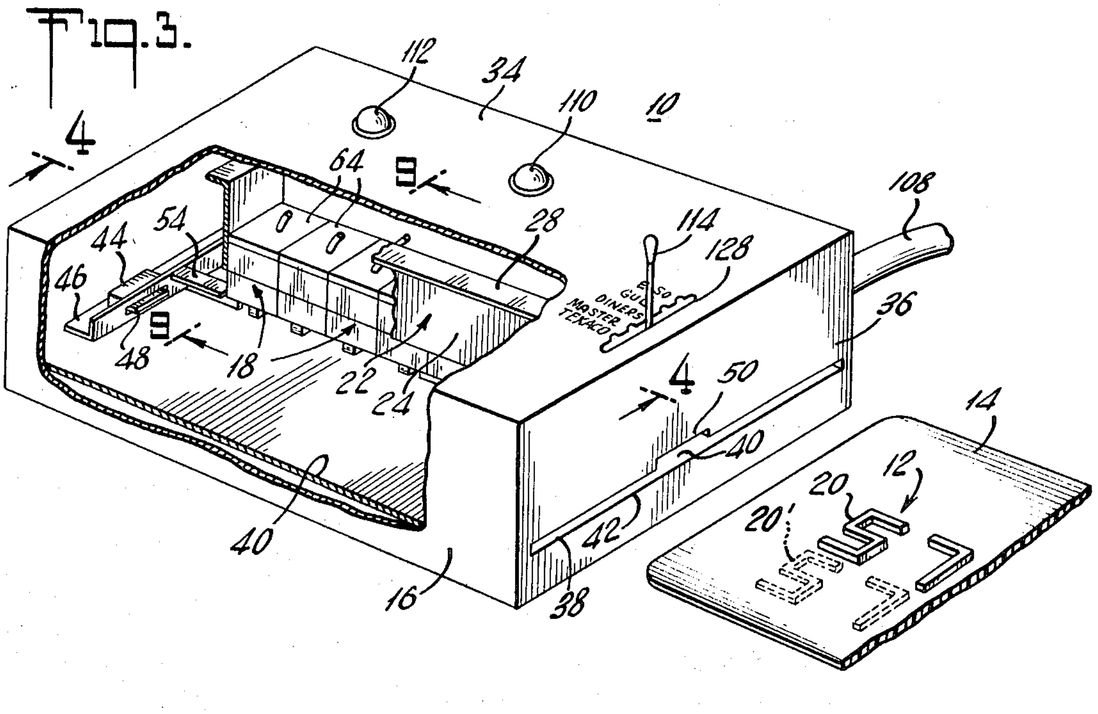
FIG. 3 shows a credit card reader constructed in accordance with the teachings of the instant invention.

Specifically, to detect the characters in the style of the FIG. 2*a* font, sensing element A through G must take the shape illustrated in FIG. 2*b*, the matrix selection pattern of which is indicated at FIG. 2*c*. Physically speaking, with the exception of the shape of the sensing element, (illustrated for example for the element D in FIG. 2*d*) and the shape of the corresponding passageways in the lower wall 70 of the respective character recognition modules 18, all other physical characteristics of the instant invention remain the same.

Additionally, it should be pointed out, that the sensing elements of FIG. 2*b* will also detect the presence of characters displayed in the font of FIG. 1*a*, assuming of course that proper logic is provided in accordance with the equations developed previously. Moreover, it can be shown that with the pattern of FIG. 2*b*, the following equations can be used to read either the fonts of FIGS. 1*a* or 2*a* so long as an appropriate input $t_1$ or $t_2$ is provided corresponding to the particular font being read:

$0 = \overline{D} \cdot G$ $1 = \overline{B} \cdot \overline{C}$ $2 = (E \cdot \overline{F})$ $3 = (\overline{B} \cdot C \cdot \overline{E}) \cdot ((F \cdot t_2) + (D \cdot t_1))$ $4 = (\overline{C} \cdot \overline{G} \cdot t_2) + (\overline{A} \cdot C \cdot t_1)$ $5 = (B \cdot \overline{C}) \cdot ((A \cdot t_1) + (\overline{E} \cdot t_2))$ $6 = \overline{A} \cdot \overline{C}$ $7 = (\overline{D} \cdot \overline{G} \cdot t_1) + (\overline{E} \cdot \overline{F} \cdot t_2)$ $8 = B \cdot C \cdot D \cdot E$ $9 = A \cdot B \cdot C \cdot \overline{G}$ where $t_1$ = select Font 1*a*

$t_2$ = Select Font 2*a*

For example, consider the equation $3 = \overline{B} \cdot C \cdot D \cdot \overline{E}$ for detecting the presence of a 3 in the font of FIG. 1*a*. Consider also the equation $$3 = (\overline{B} \cdot C \cdot \overline{E}) \cdot [(F \cdot t_2) + (D \cdot t_1)]$$

for detecting a 3 with the combined equations presented above. If $t_1$ is an input and $t_2$ is not an input (indicating font of FIG. 1*a* is being read), it will be appreciated that the equation for "3" in the combined logic reduces itself to the equation for the numeral "3" in the style of the font of FIG. 1*a*. If $t_2$ is an input and $t_1$ is not an input (indicating that the font of FIG. 2*a* is being read), it can be shown that the equation for the numeral "3" will reduce itself to the proper equation for the number 3 were the equations developed for the font of FIG. 2*a* alone.

Thus in the embodiment of the instant invention wherein either the font of FIG. 1*a* or the font of FIG. 2*a* can be read, logic circuitry similar to the circuitry of FIG. 12 can be provided which represents the combined logic equations reproduced above.

Figure 4:
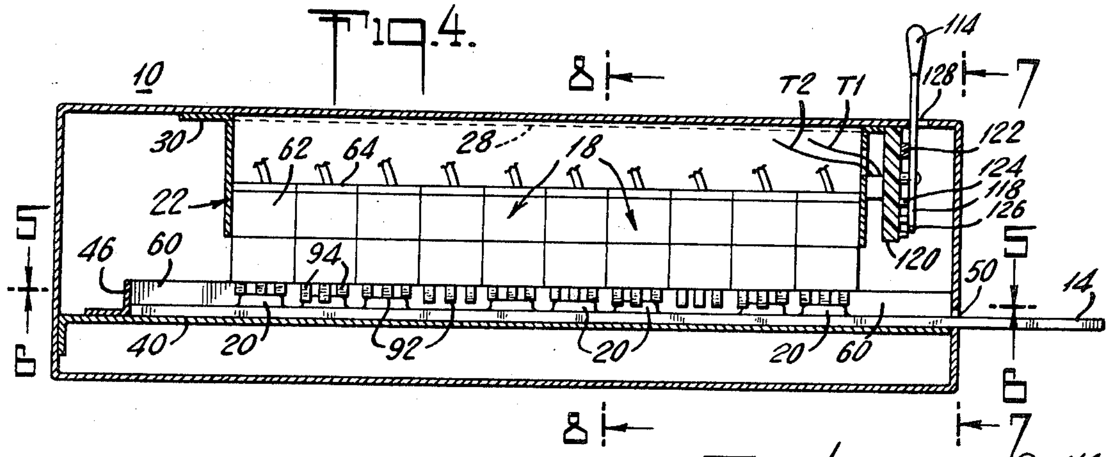
FIG. 4 is a view partly in section taken along the arrows 4—4 of FIG. 3.
Figure 4A:
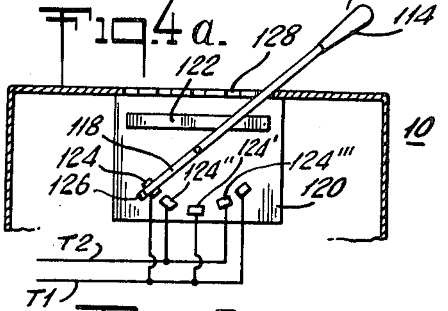
FIG. 4*a* is a view showing a style selection switch mounted in a credit card reader constructed in accordance with the teachings of this invention.
Figure 5:
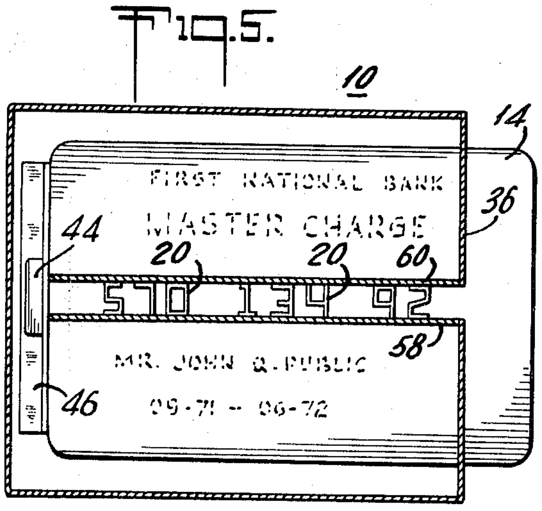
FIG. 5 is a view taken along the arrows 5—5 of FIG. 4 and illustrating the manner in which an embossed credit card is guided into the credit card reader of FIG. 3.

To provide the proper input $t_1$ or $t_2$ in accordance with the particular font being sensed, the internal end 118 of the card selection handle 114 cooperates with a simple rotary switch 120 (FIG. 4*a*) provided with a continuous contact pad 122 and a plurality of spaced apart contact pads 124 which are electrically bridged by a conductive lower portion 126 of the card selection handle 114.

In operation, an elongated slot 128 is provided in the upper surface of the housing frame 16 (FIG. 3), and a plurality of discrete positions are established corresponding to the credit cards expected to be read by the reader 10. For the reader of FIG. 3, it is assumed for the sake of illustration that the "Esso" credit card and a "Master Charge" credit card employ the font style of FIG. 1*a* whereas the "Diners" credit card and the "Texaco" credit card employ the font style of FIG. 2*a*. Accordingly, if an Esso card or Master Charge card is received, the operator, in addition to inserting the card, would move the selection lever 114 to the position corresponding to Esso or Master Charge in FIG. 3. This would have the effect of causing the lower portion 126 of the card selection handle 114 to bridge the conductive pad 122 with either the pad 124 or 124' in FIG. 4a thereby establishing the font selection signal $t_1$ for the various logic circuits of the character recognition modules 18. Should a card such as a Diners card or Texaco card be inserted, the operator moves the handle 114 accordingly to establish contact at the pad 124'' or 124''' and thereby establish a signal on the line $t_2$ indicative of the fact that the font style of FIG. 2*a* is being detected. Of course, other techniques for establishing the $t_1$ or $t_2$ signal representative of the font being detected can be employed. For example the card reader 10 could be provided with a series of push buttons corresponding to the various credit cards to be expected with the outputs of such push buttons being appropriately parallel in the manner suggested in FIG. 4a to provide a $t_1$ or $t_2$ signal in accordance with the font on the respective cards.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. A device for detecting the presence or absence of information in the form of raised portions of an information bearing medium; said device comprising:

a plurality of sensors, each of said sensors being movable between a first and second position in response to a raised portion of said medium being positioned therebeneath;

an integrated circuit having a plurality of pressure sensitive responsive regions disposed in said integrated circuit in a predetermined array; and means for mounting said integrated circuit to coact with said plurality of sensors; said integrated circuit being oriented in that each of said plurality of sensors produces an electrical signal in one of said plurality of pressure sensitive responsive regions in response to the presence of a raised portion of said medium being positioned beneath said associated sensor.

2. The device of claim 1 and further including a support wall through which a plurality of passageways is provided; said passageways being arranged in said array, each of said sensors being slidingly located in a respective one of said passageways.

3. The device of claim 1 also including:

logic circuit means responsive to said electrical signals for producing output signals; said logic circuit means being formed as an integral part of said integrated circuit.

4. The device as defined in claim 3 in which each of said pressure sensitive responsive regions includes a bistable circuit formed as an integral part of said integrated circuit;

said bistable circuit switching from a first to a second stable state in response to pressure being applied thereto.

5. The device of claim 2 also including:

logic circuit means responsive to said electrical signals for producing output signals; said logic circuit means being formed as an integral part of said integrated circuit.

6. The device as defined in claim 5 in which each of said pressure sensitive responsive regions includes a bistable circuit formed as an integral part of said integrated circuit;

said bistable circuit switching from a first to a second stable state in response to pressure being applied thereto.

7. A device for detecting the presence or absence of information in the form of raised portions of an information bearing medium; said device comprising:

a plurality of sensors, each of said sensors being movable between a first and second position in response to a raised portion of said medium being positioned therebeneath;

a plurality of pressure sensitive responsive means responsive to an associated one of said sensors moving to its respective second position for producing an electrical signal indicative of the presence of a raised portion of said medium being positioned beneath said associated sensor;

said sensors are arranged in a pattern preselectively chosen to sense the presence of predetermined patterns of information raised from the planar surface of said medium; and further comprising logic circuit means responsive to said electrical signals for producing output signals representative of said patterns;

said pattern is arranged to sense the presence of predetermined patterns in at least first and second styles of display; and further including style selection means cooperating with said logic circuit means for producing proper output signals in accordance with the selection of said first or second style of display.

8. A device for detecting the presence or absence of information in the form of raised portions of an information bearing medium; said device comprising;

a housing frame having locating means for locating said information bearing medium at a predetermined position therein;

a plurality of character recognition modules supported within said housing frame adjacent said predetermined position; each of said character recognition modules comprising;

a plurality of sensors, each of said sensors being movable between a first and second position in response to a raised portion of said medium being positioned therebeneath;

a plurality of pressure sensitive responsive means responsive to an associated one of said sensors moving to its respective second position for producing an electrical signal indicative of the presence of a raised portion of said medium being positioned beneath said associated sensor;

the sensors of each module are arranged in a pattern preselectively chosen to sense the presence of predetermined patterns of information raised from the planar surface of said medium;

further including logic circuit means associated with each of said modules and responsive to the electrical signals produced by the pressure sensitive responsive means associated with the respective module for producing output signals representative of the character sensed by the respective module;

each of said modules includes an interior chamber and a support wall through which a plurality of passageways is provided, said passageways of each module being arranged in said pattern;

each of said sensors of a respective module being slidingly located in a respective one of said passageways of said respective module;

said plurality of pressure sensitive responsive means of a respective module is located in an integrated circuit in the chamber of said respective module; and said plurality of pressure sensitive responsive means being arranged in said integrated circuit in said pattern.

9. The device of claim 8 wherein said pressure sensitive responsive means each comprise electrical means for switching between a first state and a second state to thereby produce said electrical signal in response to said sensor means moving to its second position; and wherein said electrical means comprises semiconductor means switchable between said first and second states.

10. The device of claim 8 wherein said logic circuit means associated with each of said module is a portion of the integrated circuit of each respective module.

11. A device for detecting the presence or absence of information in the form of raised portions of an information bearing medium; said device comprising;

a housing frame having locating means for locating said information bearing medium at a predetermined position therein;

a plurality of character recognition modules supported within said housing frame adjacent said predetermined position; each of said character recognition modules comprising;

a plurality of sensors, each of said sensors being movable between a first and second position in response to a raised portion of said medium being positioned therebeneath;

a plurality of pressure sensitive responsive means responsive to an associated one of said sensors moving to its respective second position for producing an electrical signal indicative of the presence of a raised portion of said medium being positioned beneath said associated sensor;

the sensors of each module are arranged in a pattern preselectively chosen to sense the presence of predetermined patterns of information raised from the planar surface of said medium;

further including logic circuit means associated with each of said modules and responsive to the electrical signals produced by the pressure sensitive responsive means associated with the respective module for producing output signals representative of the character sensed by the respective module;

each of said modules includes an interior chamber and a support wall through which a plurality of passageways is provided, said passageways of each module being arranged in said pattern;

each of said sensors of a respective module being slidingly located in a respective one of said passageways of said respective module;

said plurality of pressure sensitive responsive means of a respective module is located in an integrated circuit in the chamber of said respective module;

said plurality of pressure sensitive responsive means being arranged in said integrated circuit in said pattern;

said logic circuit means associated with each of said module is a portion of the integrated circuit of each respective module;

said pattern is arranged to sense the presence of predetermined characters in at least first and second styles of display;

and further including style selection means cooperating with each of said logic circuit means for providing proper output signals in accordance with the selection of said first or second style of display.

12. A device for detecting the presence or absence of information in the form of raised portions of an information bearing medium; said device comprising;

a housing frame having locating means for locating said information bearing medium at a predetermined position therein;

a plurality of character recognition modules supported within said housing frame adjacent said predetermined position; each of said character recognition modules comprising;

a plurality of sensors, each of said sensors being movable between a first and second position in response to a raised portion of said medium being positioned therebeneath;

a plurality of pressure sensitive responsive means responsive to an associated one of said sensors moving to its respective second position for producing an electrical signal indicative of the presence of a raised portion of said medium being positioned beneath said associated sensor;

said housing frame includes an entrance slot in one wall thereof for the reception of said information bearing medium and support means within said frame for supporting the movement of said medium in said housing frame;

sensing means located in said housing frame for detecting when said medium has reached its proper position in said housing frame;

the height of said slot corresponds to the thickness of said medium, and said locating means comprises an enlargement area of said slot, said enlargement area corresponding in cross section to the cross section of said raised portions of said medium; and guide means associated with said enlargement area for guiding said raised portions in proper relationship with respect to said modules.

13. The device of claim 1 wherein the width of said entrance slot is greater than the width of said medium, whereby said device can accept mediums having said raised portions located at different locations thereon.

14. A device for detecting the presence or absence of information in the form of raised portions of an information bearing medium; said device comprising:

sensing means for detecting the presence of raised portions of an information bearing medium therebeneath;

responsive means responsive to said sensing means for producing electrical signals indicative of the presence of said raised portions;

said sensing means being arranged in a pattern preselectively chosen to sense the presence of predetermined patterns of information raised from the planar surface of said medium; and further comprising logic circuit means responsive to said electrical signals for producing output signals representative of said patterns and wherein said pattern is arranged to sense the presence of predetermined patterns in at least first and second styles of display; and style selection means cooperating with said logic circuit means for providing proper output signals in accordance with the selection of said first or second style of display.

* * * * *